US012354244B2

United States Patent
Naik et al.

(10) Patent No.: US 12,354,244 B2
(45) Date of Patent: Jul. 8, 2025

(54) SYSTEMS AND METHODS FOR REVERSIBLE TRANSFORMATIONS USING DIFFUSION MODELS

(71) Applicant: Salesforce, Inc., San Francisco, CA (US)

(72) Inventors: Nikhil Naik, Mountain View, CA (US); Bram Wallace, Auburn, WA (US)

(73) Assignee: Salesforce, Inc., San Francisco, CA (US)

( * ) Notice: Subject to any disclaimer, the term of this patent is extended or adjusted under 35 U.S.C. 154(b) by 395 days.

(21) Appl. No.: 18/175,156

(22) Filed: Feb. 27, 2023

(65) Prior Publication Data

US 2024/0161248 A1    May 16, 2024

Related U.S. Application Data

(60) Provisional application No. 63/383,352, filed on Nov. 11, 2022.

(51) Int. Cl.
*G06T 5/70* (2024.01)
*G06T 5/30* (2006.01)
*G06T 5/50* (2006.01)

(52) U.S. Cl.
CPC .......... *G06T 5/70* (2024.01); *G06T 5/30* (2013.01); *G06T 5/50* (2013.01);
(Continued)

(58) Field of Classification Search
CPC .... G06T 5/70; G06T 5/30; G06T 5/50; G06T 2207/20081; G06T 2207/20084; G06T 2207/20216; G06T 11/60; G06T 5/60; G06T 5/90; G06T 5/73; G06T 5/77; G06T 5/92; G06T 5/94; G06T 2207/11082; G06T 11/00; G06T 11/001; G06T 2207/10016; G06T 3/4046; G06T 9/002; G06T 2207/20076; G06V 10/30; G06V 30/164; G06V 10/454; G06V 10/54; G06V 10/774; G06V 10/82; G06V 20/41; G06V 30/18057; G06V 20/698; G06V 30/19173; G06F 40/279; G06F 40/40; G06F 18/214; G06F 18/22; G06F 18/241; G06F 18/24; G06F 18/2411; G06F 18/2415; G06F 30/27; G06N 3/02; G06N 3/08–088; G06N 3/0445; G06N 3/0454; G06N 3/0464;
(Continued)

(56) References Cited

U.S. PATENT DOCUMENTS 11,599,972 B1 *  3/2023  Xu .................... G06N 3/045
11,922,550 B1 *  3/2024  Ramesh ............. G06F 40/284
(Continued)

*Primary Examiner* — Jose L Couso
(74) *Attorney, Agent, or Firm* — Haynes and Boone, LLP

(57) ABSTRACT

Embodiments described herein provide systems and methods for image editing, a first copy and a second copy of an input image are generated; noise is iteratively added to the first copy and the second copy by: updating the first copy based on a first inverted output of a denoising diffusion model (DDM) based on the second copy and a first caption and updating the second copy based on a second inverted output of the DDM based on the first copy and the first caption. A resultant noised image is iteratively denoised by a reverse process using the DDM conditioned on a second caption, thereby producing a final image.

20 Claims, 8 Drawing Sheets

(52) U.S. Cl.
CPC ............... *G06T 2207/20081* (2013.01); *G06T 2207/20084* (2013.01); *G06T 2207/20216* (2013.01)

(58) Field of Classification Search
CPC ...... G06N 3/4046; G06N 3/4053; G06N 7/00; G06N 7/01; G06N 20/00; G06K 7/1482; Y10S 128/925
See application file for complete search history.

(56) References Cited

U.S. PATENT DOCUMENTS

| | | | |
|---|---|---|---|
| 2022/0122308 A1* | 4/2022 | Kalarot | G06T 3/02 |
| 2022/0398697 A1* | 12/2022 | Vahdat | G06N 3/0464 |
| 2022/0405583 A1* | 12/2022 | Vahdat | G06N 3/0464 |
| 2023/0067841 A1* | 3/2023 | Saharia | G06N 3/047 |
| 2023/0095092 A1* | 3/2023 | Xiao | G06T 5/70 382/254 |
| 2023/0103638 A1* | 4/2023 | Saharia | G06V 10/454 382/155 |
| 2023/0109379 A1* | 4/2023 | Kreis | G06N 3/047 382/157 |
| 2023/0153949 A1* | 5/2023 | Huang | G06T 5/60 382/254 |
| 2023/0153959 A1* | 5/2023 | Saharia | G06T 5/70 382/100 |
| 2023/0368073 A1* | 11/2023 | Karras | G06T 5/70 |
| 2023/0368337 A1* | 11/2023 | Karras | G06N 3/044 |
| 2023/0377099 A1* | 11/2023 | Kreis | G06N 3/0475 |
| 2023/0419075 A1* | 12/2023 | Koike Akino | G06N 3/04 |
| 2024/0087179 A1* | 3/2024 | Min | G06T 11/00 |
| 2024/0087196 A1* | 3/2024 | Min | G06V 10/764 |
| 2024/0104698 A1* | 3/2024 | Nie | G06N 3/044 |
| 2024/0161250 A1* | 5/2024 | Balaji | G06T 5/70 |
| 2024/0161327 A1* | 5/2024 | Chen | G06T 3/40 |

\* cited by examiner

SYSTEMS AND METHODS FOR REVERSIBLE TRANSFORMATIONS USING DIFFUSION MODELS

CROSS REFERENCES

The instant application is a nonprovisional of and claim priority under 35 U.S.C. 119 to U.S. provisional application No. 63/383,352, filed Nov. 11, 2022, which is hereby expressly incorporated by reference herein in its entirety.

TECHNICAL FIELD

The embodiments relate generally to image editing and machine learning systems, and more specifically to diffusion inversion through coupled transformations.

BACKGROUND

Machine learning systems have been widely used in image generation. One type of machine learning models, referred to as denoising diffusion models (DDMs), are trained to learn the patent structure of a dataset by modeling the way in which data points diffuse through the latent space. DDMs can be applied to a variety of tasks, including image denoising, inpainting, super-resolution, and image generation. For example, an image generation DDM model would start with a random noise image and then, after having been trained reversing the diffusion process on natural images, the DDM would be able to generate new natural images. DDMs trained with sufficient data can generate highly realistic images conditioned on input text, layouts, and scene graphs.

DDMs may also be repurposed in order to modify an image. Existing methods, however, result in significant distortions. Instability in existing methods results in inexact reconstructions of an image, specifically distortions in portions of the image that were intended to remain unchanged. Therefore, there is a need for improved systems and methods for image editing.

DETAILED DESCRIPTION

Figure 1:
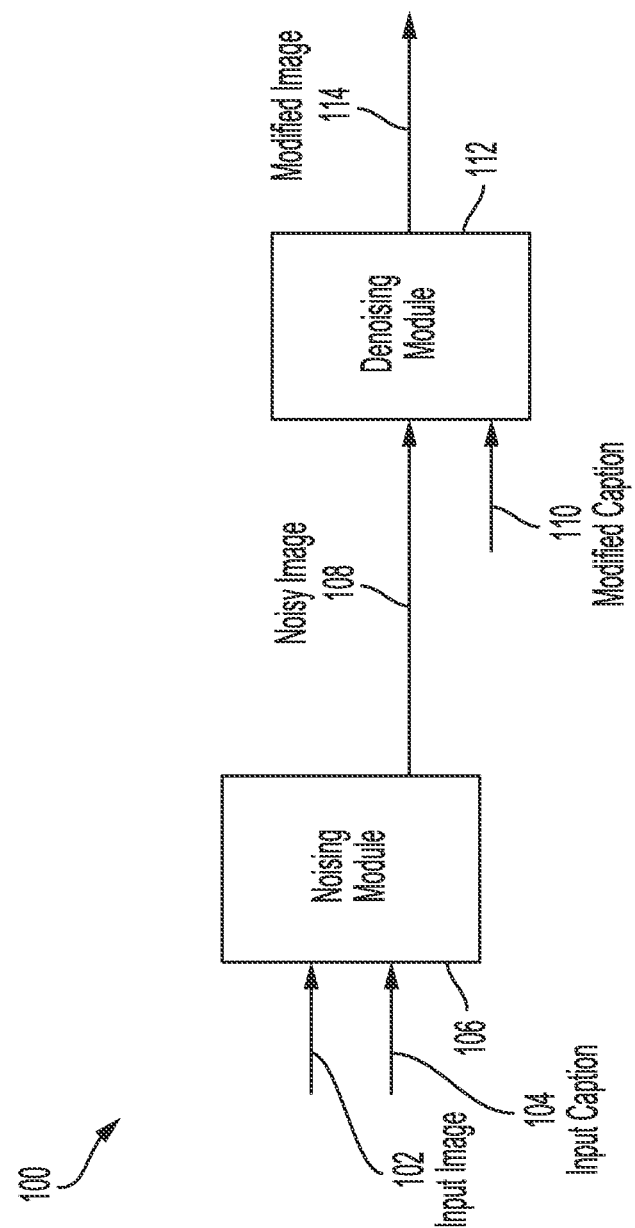
FIG. 1 is a simplified diagram illustrating an image editing framework according to some embodiments.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Machine learning systems have been widely used in image generation. One type of machine learning models, referred to as denoising diffusion models (DDMs), are trained to learn the patent structure of a dataset by modeling the way in which data points diffuse through the latent space. DDMs can be applied to a variety of tasks, including image denoising, inpainting, super-resolution, and image generation. For example, an image generation DDM model would start with a random noise image and then, after having been trained reversing the diffusion process on natural images, the DDM would be able to generate new natural images. DDMs trained with sufficient data can generate highly realistic images conditioned on input text, layouts, and scene graphs.

Embodiments herein provide systems and methods for using a DDM for accurate image editing based on a reversible noising process. The reversible process includes making two copies, denoted by "X" and "Y", of the original image and alternately updating each one with information from the other in a reversible way. At each step, image "X" is updated based on the DDM update vector determined based on image Y, then image Y is updated based on the DDM update vector determined based on image X. To perform the reverse, the method takes advantage of the fact that the image upon which the DDM update vector was determined is still available as the DDM update vector was not applied to the image itself, but the other image. In this way, the process may be reversed exactly. This forms an affine coupling between the two stored images, where the coupled transformations are iteratively reversible as will be described in more detail herein.

In one embodiment, during the reversible process, if the same prompt (e.g., a text accompanying the input image, such as "dog on a surfboard") is used for noising and denoising, the original image may be reproduced exactly. When denoising with a different prompt, unedited portions of the image may be maintained with high fidelity, while the edited portion is changed.

Embodiments described herein provide a number of benefits. For example, the DDM reversible process can be a scalable, ready-to-use add-on tool on top of any existing DDM-based image generation models, without computationally expensive fine-tuning of models. In this way, performance of image generation models may be improved with the DDM reversible process with minimum computational overhead, and system efficiency of vision systems are largely improved.

Overview

As a preliminary matter, DDMs are often trained on a simple denoising objective. A set of timesteps index a monotonic strictly increasing noising schedule $\{a_t\}_{t=0}^T$, $a_T=0$, $a_0=1$. Images (or auto-encoded latents) $x \in X$ are noised with draws $\in \sim N(0,1)$ according to the noising schedule following the formula $$x_t = \sqrt{a_t}x + \sqrt{1-a_t}\in \quad (1)$$

The time-aware DDM $\Theta$ is trained on the objective MSE($\Theta(x_t, t, C), \in$) to predict the noise added to the original image where C is a conditioning signal (typically in the form of a text embedding) with some degree of dropout to the null conditioning $\emptyset$. To generate a novel image from a gaussian draw $\in_T \sim N(0,1)$, partial denoising is applied at each t. The most common sampling scheme is that of DDIM as described in Song et aL, Denoising diffusion implicit models, arXiv preprint arXiv:2010.02502, 2020, where intermediate steps are calculated as $$x_{t-1} = \sqrt{\alpha_{t-1}}\frac{x_t - \sqrt{1-\alpha_t}\Theta(x_t, t, C)}{\sqrt{\alpha_t}} + \sqrt{1-\alpha_{t-1}}\Theta(x_t, t, C) \quad (2)$$

In one embodiment, for text-to-image models to hallucinate from random noise an $x_0$ that matches conditioning C to desired levels, the model has to be biased more heavily towards generations aligned with C. To do so, a pseudo-gradient $G \cdot (\Theta(x_t, t, C) - \Theta(x_t, t, \emptyset))$ is added to the unconditional prediction $\Theta(x_t, t, \emptyset)$ to up-weight the effect of conditioning, where G is a weighting parameter, Substituting $\phi(x_t, t, C, G) = \Theta(x_t, t, \emptyset) + G \cdot (\emptyset(x_t, t, C) - \Theta(x_t, t, \emptyset))$ into the prior equation for the $\Theta$ term, we simplify the notation $\phi(x_t, t, C, G) \rightarrow \in(x_t, t)$ and rewrite the previous equation as $x_{t-1} = a_t x_t + b_t \in (x_t, t)$ (where $$a_t = \sqrt{a_{t-1}/a_t} \quad (3)$$

$$b_t = -\sqrt{a_{t-1}(1-a_t)/a_t} + \sqrt{1-a_{t-1}} \quad (4)$$

The above denoising process is approximately invertible; that is $x_t$ is approximately recoverable from $x_{t-1}$ $$x_t = \frac{x_{t-1} b_t \in (x_t, t)}{a_t} \approx \frac{x_{t-1} b_t \in (x_{t-1}, t)}{a_t} \quad (5)$$

where the approximation is a linearization assumption that $\in(x_t, t) \approx \in (x_{t-1}, t)$ (necessary due to the discrete nature of both computation and the underlying noise schedule). This corresponds with reversing the Euler integration which is a first-order ODE solver. Even more sophisticated solvers are approximations where the inversion accuracy ultimately relies on the strength of the linearization assumption and the reconstruction is not exactly equal. This assumption is largely accurate for unconditional DDIM models, but the pseudo-gradient of classifier-free guidance $G \cdot (\Theta(x_t, t, C) - \Theta(x_t, t, \emptyset))$ is inconsistent across time steps.

While unconditional reconstructions have relatively insignificant errors, conditional reconstructions are extremely distorted when noised to high levels. Obtaining an $x_t$ from $x_0$ allows for the generative process to be run with novel conditioning.

FIG. 1 is a simplified diagram illustrating a DDM-based image editing framework 100 according to some embodiments. The framework 100 comprises a noising module 106 which is operatively connected to a denoising module 112. Specifically, the noising module 106 receives an input image 102, and an associated input caption 104. Using a pretrained denoising diffusion model (DDM) as described above, or similar denoising model, the noising module 106 generates a noisy image 108. This may be done, for example, by computing a denoising vector based on input image 102 and input caption 104, and applying the opposite of the denoising vector to input image 102 in order to provide a noisy image 108. As described in more detail with reference to FIG. 2, the noising process performed by the noising module 106 may be an iterative, reversible process.

Denoising module 112 receives noisy image 108 and modified caption 110 as inputs. Using a DDM or similar denoising model, denoising module 112 may denoise noisy image 108 to provide a modified image 114. Similar to noising module 106, denoising module 112 may generate modified image 114 via an iterative process, described in more detail below in relation to FIG. 2. The modified image may have similar and/or identical features to input image 102, with changes affected by the changes between input caption 104 and modified caption 110.

For example, if input caption 104 is the same as modified caption 110, the output modified image 114 is expected to be identical to the input image 102. For another example, when the modified caption 110 is different from the input caption 104, the modified image 114 is expected to be "modified" from the input image 102 according to the modified caption 110.

For example, to perform image editing using the framework 100, a conditioning input such as a caption (e.g., the input caption in FIG. 1) may be used during iterative noising using noising steps to generate a noised image. A different caption, which represents the changes to be made (e.g., the modified caption 110) may be used as the conditioning input when denoising the noised image by performing the reverse process iteratively to generate a final edited image. For example, an input image 102 may show a dog on a surfboard, and input caption 104 may be "dog on a surfboard." To modify the image, a modified caption 110 may be "cat on a surfboard" and following the iterative noising/denoising process described herein, the output image 114 may show a cat on a surfboard, with other elements present in input image 102 unchanged.

Figure 2:
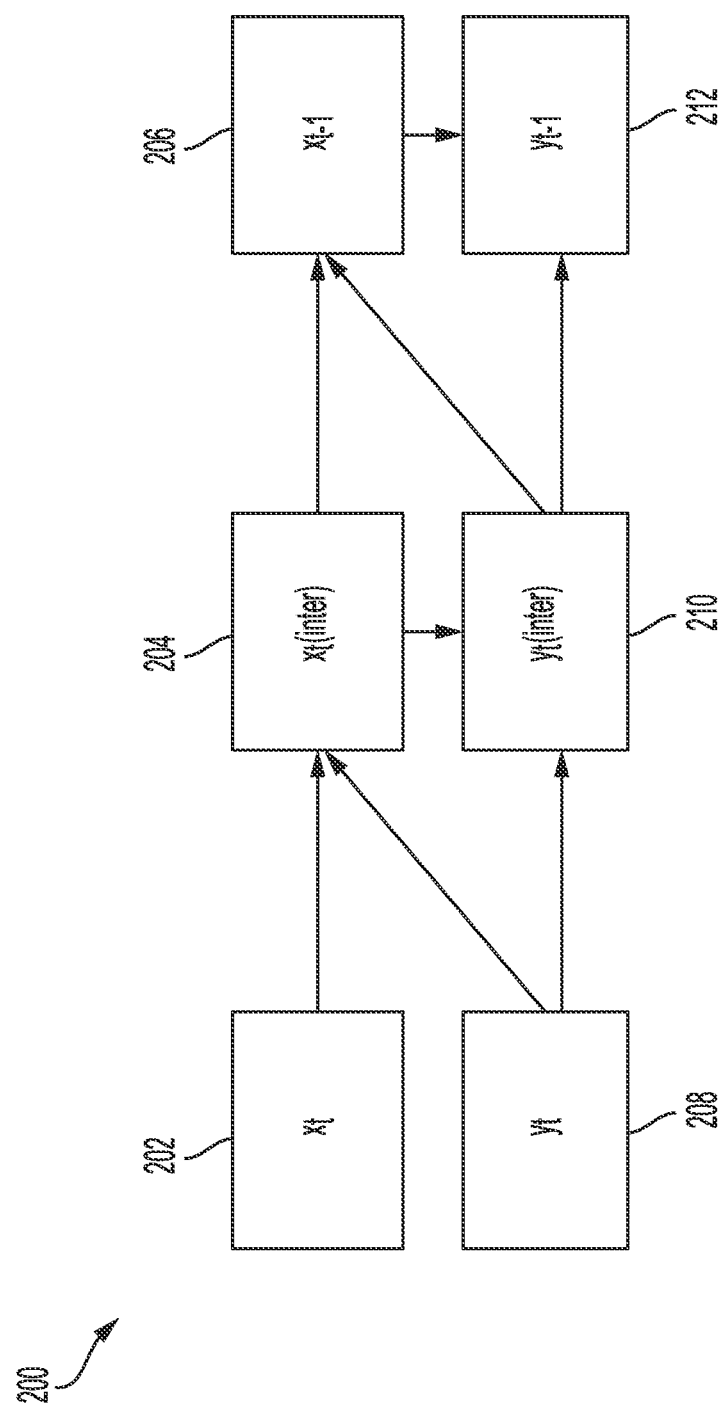
FIG. 2 is a simplified diagram illustrating a computing device implementing the EDICT framework, according to some embodiments described herein.

FIG. 2 is a simplified diagram illustrating a computing device implementing the exact diffusion inversion via a coupled transformations (EDICT) process 200, according to some embodiments described herein. By maintaining two coupled noise vectors in the diffusion process, EDICT enables recovery of the original noise vector in the case of model-generated images. For real images, initial noise vectors are guaranteed to map to the original image when the EDICT generative process is run. EDICT may be combined with any pretrained DDM model and does not require any computationally-expensive model finetuning, prompt tuning, or multiple images.

Represented graphically in FIG. 2 with image representation vector pair $x_t$ 202 and $y_t$ 208, each representing the vector representation of image "X" and its copy "Y." The image representation vector pair $x_t$ 202 and $y_t$ 208 are then processed by the reversible noising/denoising process of maintaining the two coupled noise vectors 202 and 208 using affine coupling layers.

In one embodiment, affine coupling layers (ACL) are invertible neural network layers. For example, given a layer input z, the input is split into two equal-dimensional halves $z_a$ and $z_b$. A modified version of $z_a$ is then calculated, according to:

$$z_a' = \Psi(z_b)z_a + \psi(z_b) \quad (6)$$

where $\Psi$ and $\psi$ are neural networks. The layer output z' is the concatenation of $z_a'$ and $z_b$ in accordance with the original splitting function. ACL can parameterize complex functions and z can be exactly recovered given z':

$$z_a=(z'_a-\psi(z_b))/\Psi(z_b) \quad (7)$$

Noting the similarity of equations (6) and (7) to the simplified form of Eq. (2), this construction is paralleled in EDICT where two separate quantities are tracked and alternately modified by transformations that are affine with respect to the original modified quantity and a nonlinear transformation of its counterpart.

These two quantities are partitions of a latent representation with a network specifically designed to operate in a fitting alternating manner. Therefore, back to the EDICT process 200 in FIG. 2, without training of a new DDM, this method can be applied out-of-the-box to the forward diffusion process. Assuming the image representation vector at the previous time step $x_{t-1}$ 206 can be deduced using a forward step equation:

$$x_{t-1}:=a_t x_t+b_t\in(x_t,t) \quad (8)$$

wherein $\in(x_t, t)=\varepsilon$ is a noise prediction term, was which is independent of $x_t$. This term would be an affine function in both $x_t$ and $\varepsilon$. Paralleling Eq. (6), by creating a new variable 208: $y_t=x_t$ the stepping equation fits the desired form. After performing this computation, the variables are $x_t$, $y_t=x_t$, $x_{t-1}=a_t x_t+b_t\in(y_t,t)$. $x_t$ 202 can be recovered exactly from $x_{t-1}$:

$$x_t=(x_{t-1}-b_t\in(y_t,t))/a_t \quad (9)$$

and consequently $y_t$ 208 can be recovered by: $y_t=x_t$.

In order to reverse the process (denoising), the initialization of the diffusion process, where $x_T \sim N(0,1)$, is similarly initialized $y_T=x_T$, with the reverse update rule to derive vectors 206, 212 from vectors 202 and 208, defined as:

$$x_{t-1}=a_t x_t+b_t\in(x_t,t)$$

$$y_{t-1}=a_t y_t+b_t\in(x_{t-1},t) \quad (10)$$

Note that the noise prediction term in the second line of Eq. (10) is a function of the other sequence value at the next timestep. Only one member of each sequence $(x_i, y_i)$ must be held in memory at any given time. The sequences can be recovered exactly according to the following:

$$y_t=(y_{t-1}-b_t\in(x_{t-1},t))/a_t$$

$$x_t=(x_{t-1}-b_t\in(y_t,t))/a_t \quad (11)$$

As illustrated in FIG. 2, the entire sequence can be reconstructed from any two adjacent $x_i$ and $y_i$. In sum, the reversible process guarantees recovery up to machine precision. However, when naively applied for a typical, low number of DDM steps (e.g., T=50), the sequences $x_t$ and $y_t$ can diverge. This is a result of the strong linearization assumption not holding in practice. To alleviate this problem, intermediate mixing layers may be used after each diffusion step computing weighted averages of the form $$x'=px+(1-p)y, \; 0\leq p\leq 1 \quad (12)$$

which are invertible affine transformations. The value p is controllable, and may be pre-set, or user defined. Note that this averaging layer becomes a dilating layer during deterministic noising; the inversion being:

$$x = \frac{x' - (1 - p)y}{p} \quad (13)$$

Figure 3:
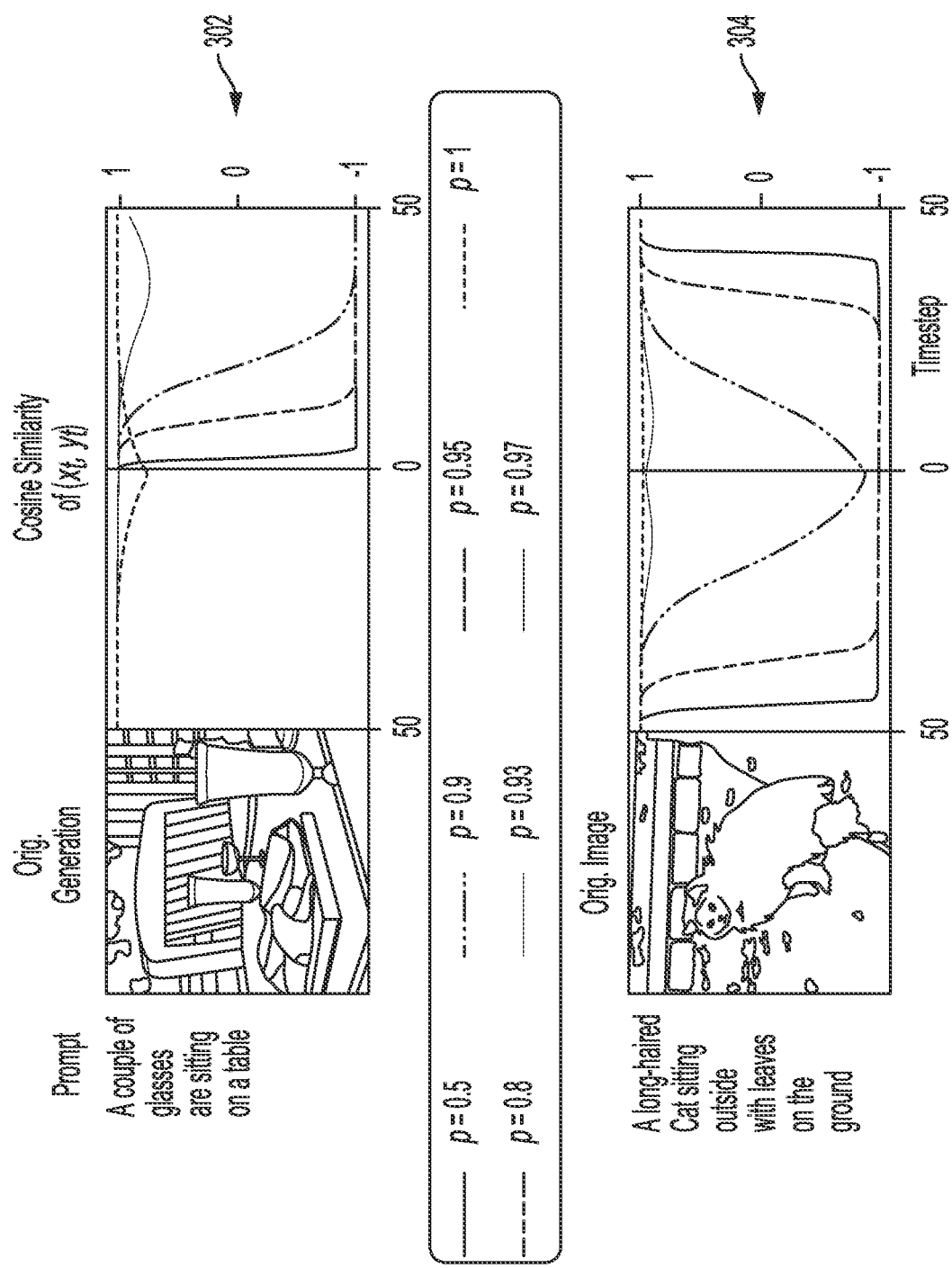
FIG. 3 illustrates the effect of different mixing coefficients, according to some embodiments described herein.

A high (near 1) value of p results in the averaging layer not being strong enough to prevent divergence of the x and y series during denoising, while a low value of p results in a numerically unstable exponential dilation in the backwards pass (discussed more with respect to FIG. 3). Note that in both cases that the generative process remains exactly mathematically invertible with no further assumptions, but there is a degradation in utility of the results. An exemplary value used for p is 0.93, with values in the interval [0.9, 0.97] generally being effective for 50 steps.

In one embodiment, the full forward and backward algorithm in EDICT 200 may be performed using a forward pass and a backward pass, with update functions as described below which include noising/denoising and averaging/dilating layers represented by the boxes in FIG. 2. For example, intermediate variable/vectors 204 and 210 may be computed based on $x_t$ 202 and $y_t$ 208. Then $y_t^{inter}$ 210 is computed based on $xx_t^{iner}$ 204 and $y_t$ 208. Next, $x_{t-1}$ 206 is computed based on $x_t^{inter}$ 204 and $y_t^{inter}$ 210.

For example, given an image representation pair $x_t$ 202 and $y_t$ 208, the denoising process is computed by:

$$x_t^{inter}=a_t \cdot x_t+b_t\in(y_t,t) \quad (14)$$

$$y_t^{inter}=a_t \cdot y_t+b_t\in(x_t^{inter},t)$$

$$x_{t-1}=p \cdot x_t^{inter}+(1-p) \cdot y_t^{inter}$$

$$y_{t-1}=p \cdot y_t^{inter}+(1-p) \cdot x_{t-1}$$

Finally, $y_{t-1}$ 212 is computed based on $x_{t-1}$ 206 and $y_t^{inter}$ 210 all according to Eq. (14).

In one embodiment, for the noising process, the output of the DDM (e), which is a vector indicating the amount to modify each value in the image vector, is inverted, such that instead of denoising the image representation is noised. At each step, each image copy (X or Y) is updated based on the inverted DDM vector based on the opposite image copy. This process may be repeated iteratively for a number of cycles with $x_{t-1}$ 206 and $y_{t-1}$ 212 being the starting pair of the next iteration, and the deterministic noising inversion process by:

$$y_{t+1}^{inter}=(y_t-(1-p) \cdot x_t)/p$$

$$x_{t+1}^{inter}+(x_t-(1-p) \cdot y_{t+1}^{inter})/p$$

$$y_{t+1}+(y_{t+1}^{inter}-b_{t+1} \cdot \in(x_{t+1}^{inter},t+1))/a_{t+1}$$

$$x_{t+1}=(x_{t+1}^{inter}-b_{t+1} \cdot \in(y_{t+1},t+1))/a_{t+1} \quad (15)$$

For the denoising process, the output of the DDM (e), is not inverted, but at each step, each image copy (x or y) is still updated based on the DDM vector based on the opposite image copy. In practice, the order in which the x and y series are calculated is alternated at each step in order to symmetrize the process with respect to both sequences. All operations may be cast to double floating point precision to mitigate roundoff floating point errors. The conditioning C based on an input caption is implicitly included in the ∈ terms. In addition to captions, other conditioning inputs may be used, such as a second image, or other multi-modal conditioning input. For example, a sketch image may be used to condition which allows the DDM to attempt to have the resulting image mimic the sketch with full image details. More generally, any reference image may be used to condition the DDM.

FIG. 3 illustrates the effect of different mixing coefficients, according to some embodiments described herein. On the top row 302, an EDICT-generated image with p=0.93, for each listed p (the mixing value described in FIG. 2) a generation is computed from T=50 to T=0, where T is the number of DDM steps, followed by reconstructing initial latents (T=50). Cosine similarity between $(x_t, y_t)$ is computed at each step. p=0.97 suffices for generative convergence but the inverse process diverges when p is too small. Repeated dilation can exponentially exaggerate small floating-point differences, annulling the theoretical guarantee. These trends hold in the bottom row 304 for a non-generated image put through the EDICT inversion/generation process. While all reconstructions ultimately are aligned, a sufficiently large p is needed for the latents to maintain alignment throughout.

Figure 4:
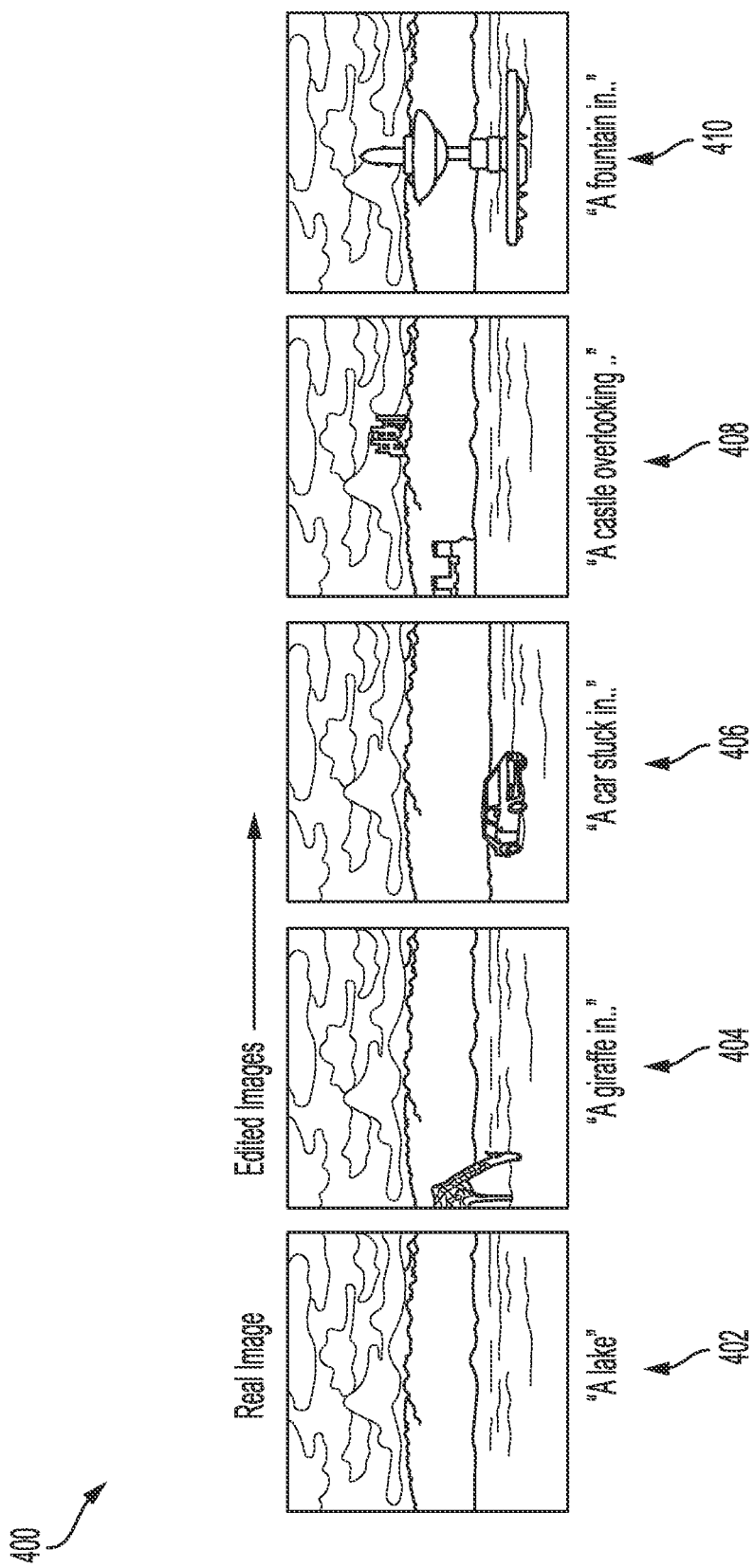
FIG. 4 illustrates exemplary images edited using the image editing framework, according to some embodiments described herein.

FIG. 4 illustrates exemplary images edited using the image editing framework 100 based on the reversible EDICT process 200, according to some embodiments described herein. As discussed in relation to FIG. 2, the noising and denoising transformations may be performed on image representations which are vector representations of an image computed using a neural network model. In order to display an image at any step, the image representation may be turned back into an image through a reverse process which uses the vector representation and generates an image for display on a user interface. Examples of images are shown in FIG. 4.

Specifically, the image editing process includes the following. Given an image I, the semantic contents are edited to match text conditioning $C_{target}$. The current content is described by text $C_{base}$ in a parallel manner to $C_{target}$. For example, as shown in FIG. 4, the original image 402 input showing a lake, is with an associated caption "A lake".

An autoencoder latent $x_0 = V\,AE_{enc}(I)$, is computed, initializing $y_0 = x_0$, the deterministic noising process of Eq. (15) is run on $(x_0, y_0)$ using text conditioning $C_{base}$ for s·S steps, where S is the number of global timesteps and s is a chosen editing strength. This yields partially "noised" latents $(x_t, y_t)$ which are not necessarily equal and, in practice, tend to diverge by a small amount due to linearization error and the dilation of the mixing layers. These intermediate representations are then used as input to Eq. (14) using text condition $C_{target}$, and identical step parameters, (s, S). For example, the text condition $C_{target}$ may demonstrate object addition such as captions "a giraffe in," "a car stuck in," "a castle overlooking," "a fountain in," and/or the like.

The resulting image outputs ($V\,AE\,dec\,(x_0^{edit})$, $VAE_{dec}(y_0^{edit})$) are expected to be substantively identical to the original image 402 except for the added or modified portions of the image. If the same caption is used for both $C_{base}$ and $C_{target}$, then the original image is reconstructed.

As shown in FIG. 4, the edited images 404, 406, 408, and 410 according to each respective target caption represent a diverse set of objects are added to a lake scene by modifying the caption during denoising as described above, demonstrating object addition. Throughout all edits, details such as the cloud patterns and patches of tree color are preserved, while the changes reflected by the captions are visible. By adjusting the modified caption accordingly, other image changes other than object addition are possible. For example, object-preserving global changes may be performed, where an object in the original image is placed into a different setting, while preserving the original detail of the object itself. Object deformations may be achieved, altering an object such as changing its orientation, color, etc. Global style changes may be achieved, for example changing an image to a cubist or impressionistic painting, or changing the season from summer to winter.

Computer and Network Environment

Figure 5:
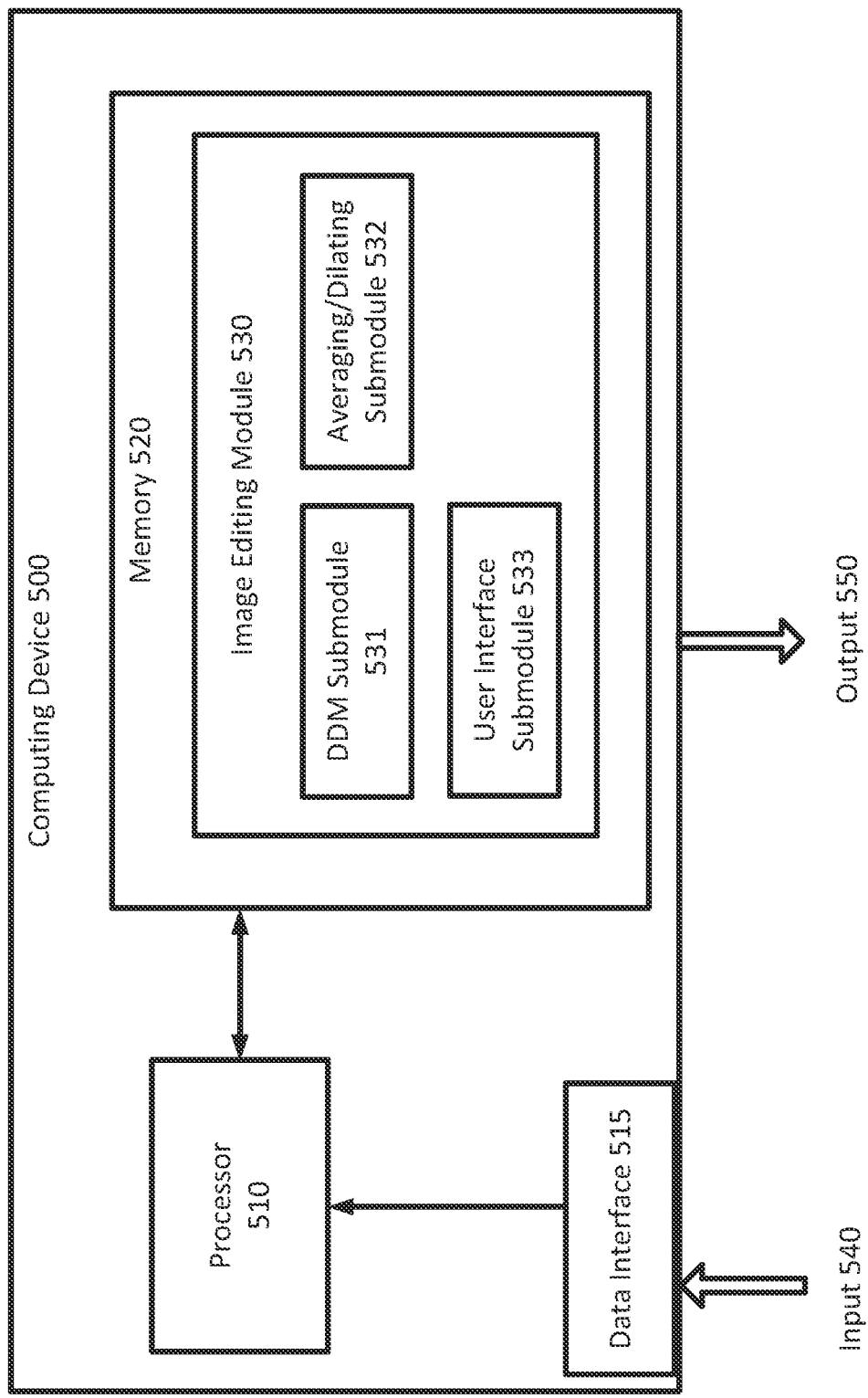
FIG. 5 is a simplified diagram illustrating a computing device implementing the image editing framework, according to some embodiments described herein.

FIG. 5 is a simplified diagram illustrating a computing device implementing the image editing framework described in FIGS. 1-4, according to some embodiments described herein. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for image editing module 530 that may be used to implement and/or emulate the systems and models, and/or to implement any of the methods described further herein. An image editing module 530 may receive input 540 such as an input image, input caption, and modified caption via the data interface 515 and generate an output 550 which may be an edited image.

The data interface 515 may comprise a communication interface, a user interface (such as a voice input interface, a graphical user interface, and/or the like). For example, the computing device 500 may receive the input 540 (such as a training dataset) from a networked database via a communication interface. Or the computing device 500 may receive the input 540, such as an input image, input caption, and modified caption, from a user via the user interface.

In some embodiments, the image editing module 530 is configured to edit an image via the noising and denoising process described herein. The image editing module 530 may further include a DDM submodule 531 which includes a pretrained DDM for use in noising and denoising. The image editing module 530 may further include an averaging/dilating submodule 532 which performs the averaging/ dilating steps described herein. The image editing module 530 may further include a user interface submodule 533 which renders images and displays images via a user interface on a display of a user device. In one embodiment, the image editing module 530 and its submodules 531-533 may be implemented by hardware, software and/or a combination thereof.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 6:
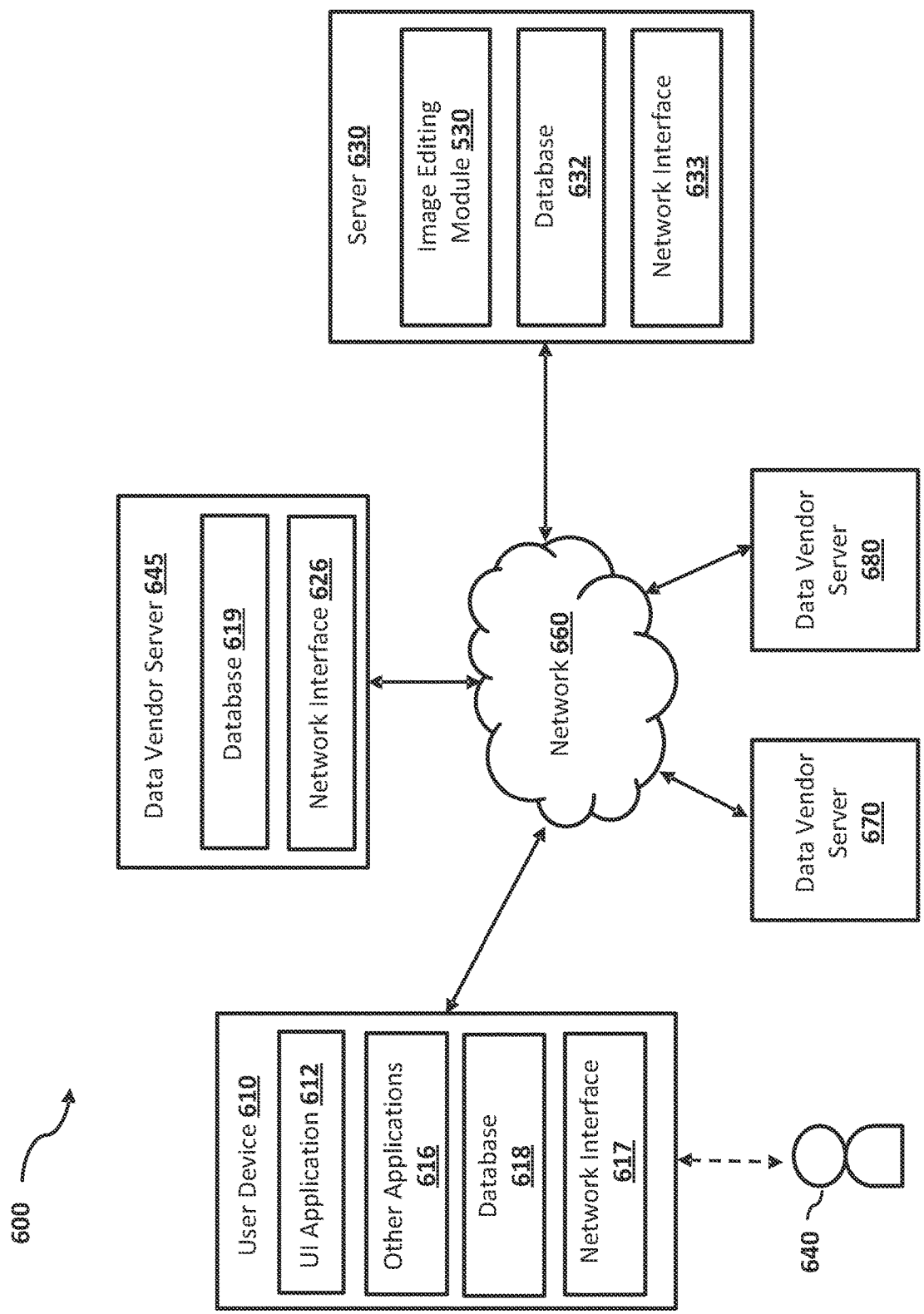
FIG. 6 is a simplified block diagram of a networked system suitable for implementing the image editing framework, according to some embodiments described herein.

FIG. 6 is a simplified block diagram of a networked system suitable for implementing the image editing framework described in FIGS. 1-4 and other embodiments described herein. In one embodiment, block diagram 600 shows a system including the user device 610 which may be operated by user 640, data vendor servers 645, 670 and 680, server 630, and other forms of devices, servers, and/or software components that operate to perform various methodologies in accordance with the described embodiments. Exemplary devices and servers may include device, standalone, and enterprise-class servers which may be similar to the computing device 500 described in FIG. 5, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive an edited image from the server 630 and display the image via the UI application 612. In other embodiments, user device 610 may include additional or different modules having specialized hardware and/or software as required.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view images.

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including images to the server 630. The database 619 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the image editing module 530 and its submodules described in FIG. 1. In some implementations, image editing module 530 may receive data from database 619 at the data vendor server 645 via the network 660 to generate images. The generated images may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the image editing module 530. In one implementation, the database 632 may store previously generated images, and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Example Work Flows

Figure 7:
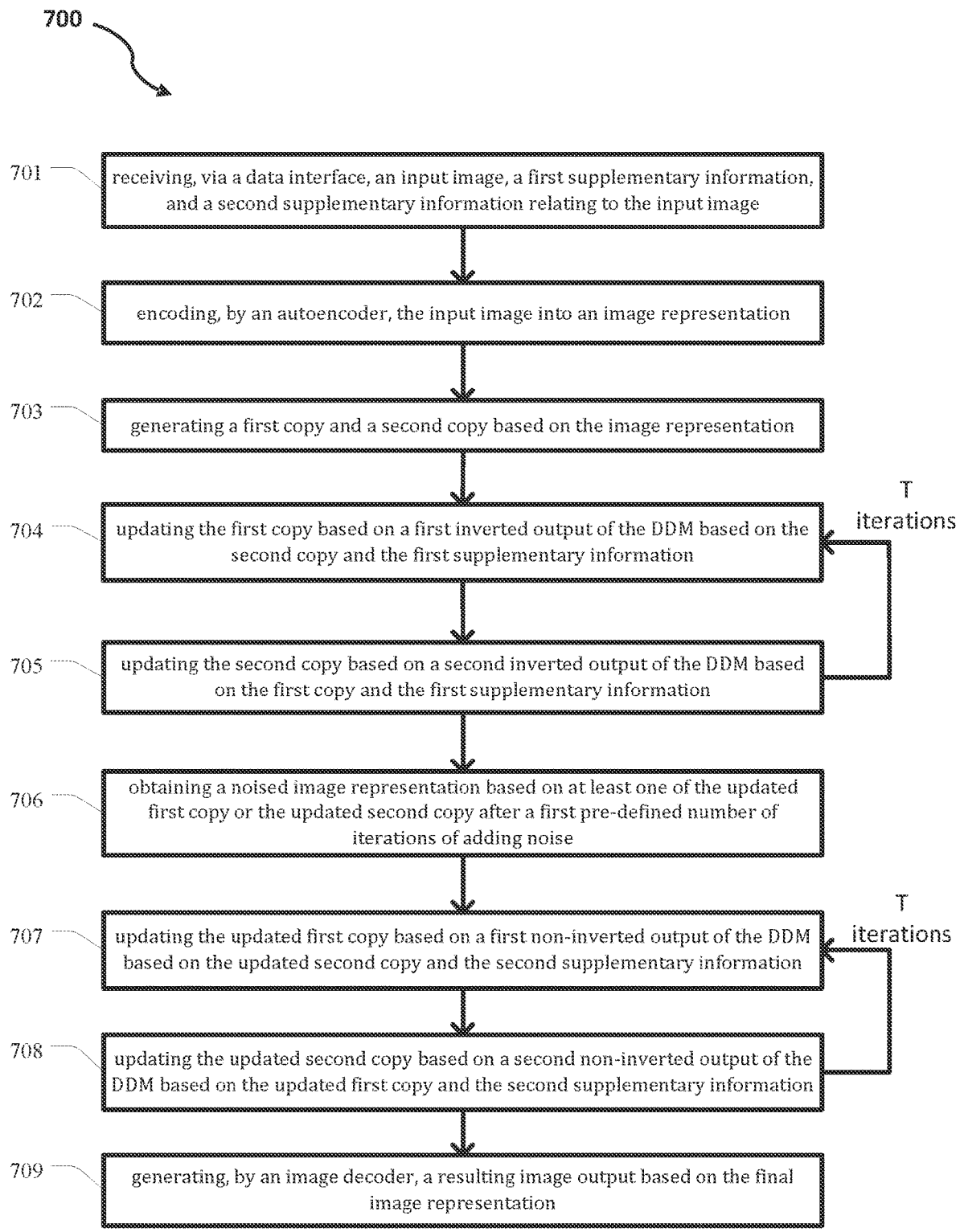
FIG. 7 is an example logic flow diagram illustrating a method of layout generation, according to some embodiments described herein.

FIG. 7 is an example logic flow diagram illustrating a method of image editing based on the framework shown in FIGS. 1-4, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the image editing module 530 (e.g., FIGS. 5-6) that performs the EDICT image editing method.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, a system receives, via a data interface (e.g., data interface 515 in FIG. 5, or network interface 633 in FIG. 6), an input image (e.g., input image 102 in FIG. 1), a first supplementary information (e.g., input caption 104), and a second supplementary information (e.g., modified caption 110) relating to the input image. The input information received via the data interface may be provided by a user via a user interface on a user device. The first supplementary information may be associated with the input image, and the modified caption may represent the desired modification to the image.

At step 702, the system encodes, by an autoencoder, the input image into an image representation.

At step 703, the system generates a first copy and a second copy based on the image representation. In some embodiments the first and second copies are exact duplicates as the input image. In other embodiments, the second copy is only generated after performing the first set of steps of the transformation in order to produce the first modified copy of the image. This may be done to utilize the memory of the system more efficiently.

At step 704, the system updates the first copy based on a first inverted output of the DDM based on the second copy and the first supplementary information. For example, as described in FIG. 2, $x_t(\text{inter})$ is generated by applying the inverse of the DDM generated vector to $x_t$, where the DDM generated vector is based on an input of $y_t$.

At step 705, the system updates the second copy based on a second inverted output of the DDM based on the first copy and the first supplementary information. For example, as described in FIG. 2, $y_t(\text{inter})$ is generated by applying the inverse of the DDM generated vector to $y_t$, where the DDM generated vector is based on an input of $x_t(\text{inter})$.

Steps 704-705 may be repeated for T iterations to achieve sufficiently noised image representations. Lower values of T may be used where smaller changes to the image are desired, and larger values of T may be used where larger changes to the image are desired. In some embodiments, T is predefined and set. In other embodiments, a user may select a value of T via a user interface in order to have more control over the image editing process. In further embodiments, the user is presented with multiple image variants, each based on a different value of T so that the user may select the desired image. In order to efficiently generate the multiple variants, the overlapping noising steps may be performed once.

In some embodiments, for each noising iteration, an averaging function may be applied to each of the two image representations, such as described in equation (14). As described above in equation (14), the weights applied to each of the image representations may be p for the image representation being transformed by the average, and (1−p) for the opposite image representation. In other words, $x_{t-1} = p \cdot x_t^{inter} + (1-p) \cdot y_t^{inter}$ and $y_{t-1} = p \cdot y_t^{inter} + (1-p) \cdot x_{t-1}$.

At step 706, the system obtains a noised image representation based on at least one of the updated first copy or the updated second copy after a first pre-defined number of iterations (e.g., T) of adding noise.

At step 707, the system updates the updated first copy based on a first non-inverted output of the DDM based on the updated second copy and the second supplementary information. For example, as described in FIG. 2, the iterative noising process may be reversed by using the non-inverted DDM outputs on alternating copies of the image, conditioned on the second supplementary information (e.g., modified caption 110).

At step 708, the system updates the updated second copy based on a second non-inverted output of the DDM based on the updated first copy and the second supplementary information.

Steps 707-708 may be repeated for T iterations to sufficiently denoise the image representations. In some embodiments, T iterations is used for both noising and denoising iteration counts. In some embodiments, different values may be used for noising and denoising.

In some embodiments, for each denoising iteration, a dilation function (the inverse of the averaging function) may be applied to each of the two image representations, such as described in equation (15). As described above in equation (15), the weights applied to each of the image representations may be p for the image representation being transformed by the average, and (1−p) for the opposite image representation. In other inter words, $y_{t+1}^{inter}=(y_t-(1-p)\cdot x_t)/p$ and $x_{t+1}^{inter}=(x_t-(1-p)\cdot y_{t+1}^{inter})/p$.

At step 709, the system generates, by an image decoder, a resulting image output based on the final image representation. The resulting image may be displayed via a display on a user device.

Example Results

Figure 8:
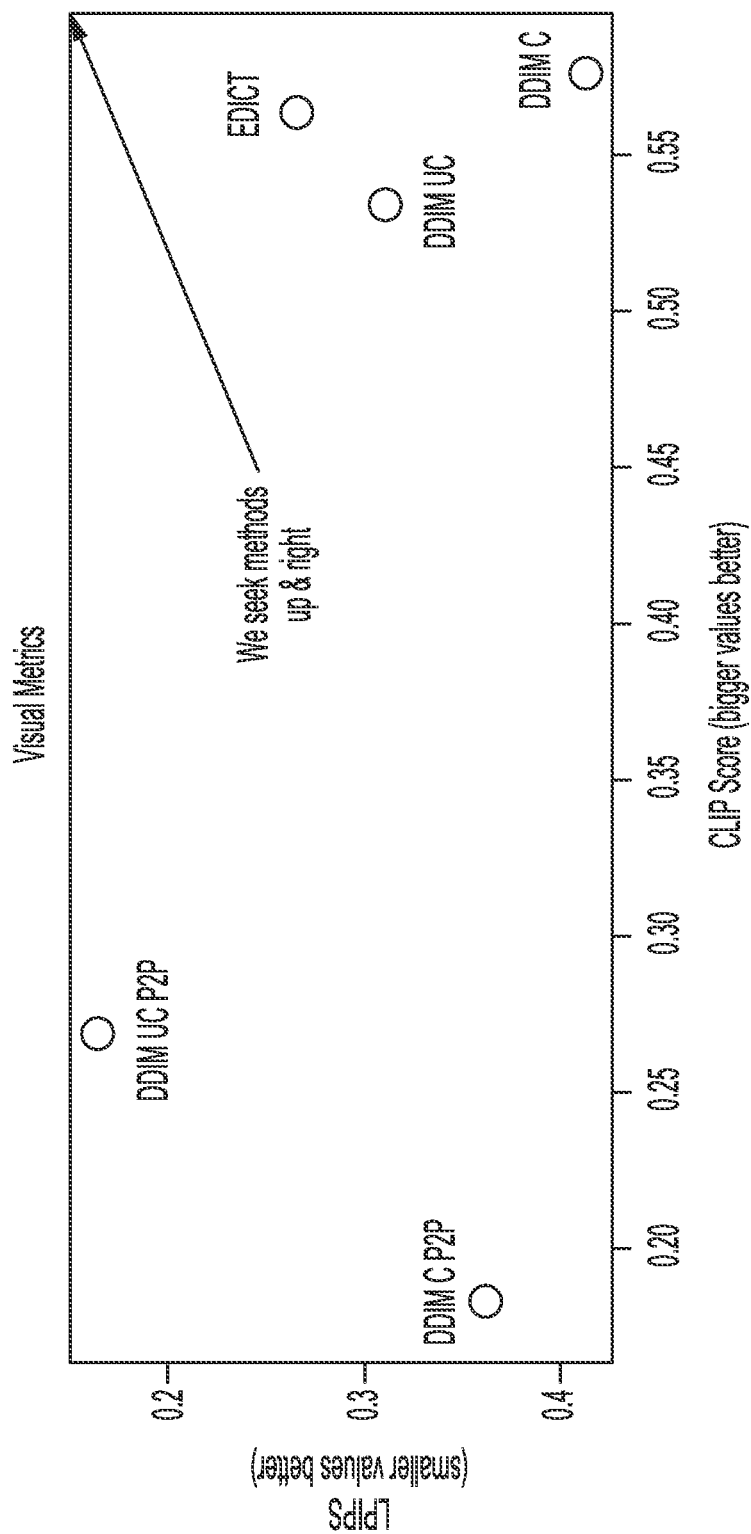
FIG. 8 provides a chart illustrating exemplary performance of an embodiment described herein compared against a number of alternative baseline methods Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

FIG. 8 provides a chart illustrating exemplary performance of an embodiment described herein compared against a number of alternative baseline methods. Baseline methods include variants of DDIM as described in Song et aL, Denoising diffusion implicit models, arXiv preprint arXiv: 2010.02502, 2020. DDIM C represents the conditional DDIM, and DDIM UC represents unconditional DDIM. P2P stands for prompt to prompt embodiments of DDIM. Methods were benchmarked on image editing using images from five ImageNet mammal classes (African Elephant, Ram, Egyptian Cat, Brown Bear, and Norfolk Terrier). Four experiments were performed, one swapping the pictures animal's species to each of the other classes (20 species editing pairs in total), two contextual changes ("A [animal] in the snow" and "A [animal] in a parking lot"), and one stylistic impressionistic painting of a [animal]). The vertical axis represents the LPIPS visual similarity score as described in Zhang et al., The unreasonable effectiveness of deep features as a perceptual metric, In CVPR, 2018. The horizontal axis represents the CLIP semantic similarity score as described in Radford et aL, Learning transferable visual models from natural language supervision, In International Conference on Machine Learning, pp. 8748-8763, PMLR, 2021. Metrics were averaged across images and experiments. EDICT largely maintains the CLIP score (0.56) of the best competing methods while substantially improving the LPIPS (0.27), quantitatively demonstrating the ability to perform state-of-the-art content changes with superior fidelity.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of image editing using a denoising diffusion model (DDM), the method comprising:
   receiving, via a data interface, an input image, a first supplementary information, and a second supplementary information relating to the input image;
   encoding, by an autoencoder, the input image into an image representation;
   generating a first copy and a second copy based on the image representation;
   iteratively adding noise to the first copy and the second copy by:
      updating the first copy based on a first inverted output of the DDM based on the second copy and the first supplementary information, and
      updating the second copy based on a second inverted output of the DDM based on the first copy and the first supplementary information;
   obtaining a noised image representation based on at least one of the updated first copy or the updated second copy after a first pre-defined number of iterations of adding noise;
   iteratively removing noise from the updated first copy and the updated second copy based on the second supplementary information, thereby producing a final image representation; and
   generating, by an image decoder, a resulting image output based on the final image representation.

2. The method of claim 1, wherein the iteratively removing noise comprises:
   generating a first intermediate image representation based on the updated first copy and a first non-inverted output of the DDM based on the updated second copy and the second supplementary information; and
   generating a second intermediate image representation based on the updated second copy and a second non-inverted output of the DDM based on the updated first copy and the second supplementary information,
   wherein the final image representation is based on at least one of the first intermediate image representation and the second intermediate image representation after a second pre-defined number of iterations of denoising.

3. The method of claim 2, wherein the iteratively removing noise further comprises:
updating the updated first copy based on a first dilation of the first copy and the second copy, and
updating the second copy based on a second dilation of the first copy and the second copy.

4. The method of claim 1, wherein the iteratively adding noise further comprises:
updating the first copy based on a first average of the first copy and the second copy, and
updating the second copy based on a second average of the first copy and the second copy.

5. The method of claim 4, wherein:
the first average and the second average are weighted averages; and
a weight applied to the first copy in the first average is the weight applied to the second copy in the second average.

6. The method of claim 1, wherein the first supplementary information is a first text caption describing the input image, and the second supplementary information is a second text caption different from the first text caption.

7. The method of claim 6, wherein the resulting image output includes a modification to the input image according to the second text caption.

8. The method of claim 1, wherein the first supplementary information is a first reference image, and the second supplementary information is a second reference image different from the first reference image.

9. A system for image editing using a denoising diffusion model (DDM), the system comprising:
a memory that stores the DDM model and a plurality of processor executable instructions;
a communication interface that receives an input image, a first supplementary information, and a second supplementary information relating to the input image; and
one or more hardware processors that read and execute the plurality of processor-executable instructions from the memory to perform operations comprising:
encoding, by an autoencoder, the input image into an image representation;
generating a first copy and a second copy based on the image representation;
iteratively adding noise to the first copy and the second copy by:
updating the first copy based on a first inverted output of the DDM based on the second copy and the first supplementary information, and
updating the second copy based on a second inverted output of the DDM based on the first copy and the first supplementary information;
obtaining a noised image representation based on at least one of the updated first copy or the updated second copy after a first pre-defined number of iterations of adding noise;
iteratively removing noise from the updated first copy and the updated second copy based on the second supplementary information, thereby producing a final image representation; and
generating, by an image decoder, a resulting image output based on the final image representation.

10. The system of claim 9, wherein the iteratively removing noise comprises:
generating a first intermediate image representation based on the updated first copy and a first non-inverted output of the DDM based on the updated second copy and the second supplementary information; and
generating a second intermediate image representation based on the updated second copy and a second non-inverted output of the DDM based on the updated first copy and the second supplementary information,
wherein the final image representation is based on at least one of the first intermediate image representation and the second intermediate image representation after a second pre-defined number of iterations of denoising.

11. The system of claim 10, wherein the iteratively removing noise further comprises:
updating the updated first copy based on a first dilation of the first copy and the second copy, and
updating the second copy based on a second dilation of the first copy and the second copy.

12. The system of claim 9, wherein the iteratively adding noise further comprises:
updating the first copy based on a first average of the first copy and the second copy, and
updating the second copy based on a second average of the first copy and the second copy.

13. The system of claim 12, wherein:
the first average and the second average are weighted averages; and
a weight applied to the first copy in the first average is the weight applied to the second copy in the second average.

14. The system of claim 9, wherein the first supplementary information is a first text caption describing the input image, and the second supplementary information is a second text caption different from the first text caption.

15. The system of claim 14, wherein the resulting image output includes a modification to the input image according to the second text caption.

16. The system of claim 9, wherein the first supplementary information is a first reference image, and the second supplementary information is a second reference image different from the first reference image.

17. A non-transitory machine-readable medium comprising a plurality of machine-executable instructions which, when executed by one or more processors, are adapted to cause the one or more processors to perform operations comprising:
receiving, via a data interface, an input image, a first supplementary information, and a second supplementary information relating to the input image;
encoding, by an autoencoder, the input image into an image representation;
generating a first copy and a second copy based on the image representation;
iteratively adding noise to the first copy and the second copy by:
updating the first copy based on a first inverted output of a denoising diffusion model (DDM) based on the second copy and the first supplementary information, and
updating the second copy based on a second inverted output of the DDM based on the first copy and the first supplementary information;
obtaining a noised image representation based on at least one of the updated first copy or the updated second copy after a first pre-defined number of iterations of adding noise;

iteratively removing noise from the updated first copy and the updated second copy based on the second supplementary information, thereby producing a final image representation; and generating, by an image decoder, a resulting image output based on the final image representation.

18. The non-transitory machine-readable medium of claim 17, wherein the iteratively removing noise comprises:

generating a first intermediate image representation based on the updated first copy and a first non-inverted output of the DDM based on the updated second copy and the second supplementary information; and generating a second intermediate image representation based on the updated second copy and a second non-inverted output of the DDM based on the updated first copy and the second supplementary information, wherein the final image representation is based on at least one of the first intermediate image representation and the second intermediate image representation after a second pre-defined number of iterations of denoising.

19. The non-transitory machine-readable medium of claim 18, wherein the iteratively removing noise further comprises:

updating the updated first copy based on a first dilation of the first copy and the second copy, and updating the second copy based on a second dilation of the first copy and the second copy.

20. The non-transitory machine-readable medium of claim 17, wherein the iteratively adding noise further comprises:

updating the first copy based on a first average of the first copy and the second copy, and updating the second copy based on a second average of the first copy and the second copy.

* * * * *